(12) United States Patent
Kim et al.

(10) Patent No.: US 7,625,651 B2
(45) Date of Patent: Dec. 1, 2009

(54) POLYMER ELECTROLYTE COMPRISING INORGANIC CONDUCTIVE NANO-PARTICLES AND FUEL CELL EMPLOYING THE POLYMER ELECTROLYTE

(75) Inventors: Hae-kyoung Kim, Kyungki-do (KR); Ju-hee Cho, Seoul (KR)

(73) Assignee: Samsung SDI Co., Ltd., Suwon-Si, Gyeonggi-Do (KR)

(*) Notice: Subject to any disclaimer, the term of this patent is extended or adjusted under 35 U.S.C. 154(b) by 730 days.

(21) Appl. No.: 10/218,563

(22) Filed: Aug. 15, 2002

(65) Prior Publication Data

US 2003/0099874 A1    May 29, 2003

(30) Foreign Application Priority Data

Oct. 30, 2001    (KR) ............... 10-2001-0067148

(51) Int. Cl.
    *H01M 8/10* (2006.01)
(52) U.S. Cl. ........................................ 429/33
(58) Field of Classification Search ........ 429/33, 429/25, 30, 13, 34, 35, 36
    See application file for complete search history.

(56) References Cited

U.S. PATENT DOCUMENTS

| | | | |
|---|---|---|---|
| 5,795,668 A | 8/1998 | Banerjee | |
| 5,849,428 A | 12/1998 | Hamlen | |
| 5,874,182 A | 2/1999 | Wilkinson et al. | |
| 5,919,583 A | 7/1999 | Grot et al. | |
| 5,958,616 A | 9/1999 | Salinas et al. | |
| 6,447,943 B1* | 9/2002 | Peled et al. | 429/33 |
| 2003/0091883 A1* | 5/2003 | Peled et al. | 429/25 |

FOREIGN PATENT DOCUMENTS

| | | |
|---|---|---|
| JP | 2000-249319 | 9/2000 |
| JP | 2000-516014 | 11/2000 |
| JP | 2001-011219 | 1/2001 |
| JP | 2001-035509 | 2/2001 |
| JP | 2001-307545 | 11/2001 |
| WO | 01/54216 A2 | 7/2001 |

OTHER PUBLICATIONS

P. Staiti et al., "Hybrid Nafion-silica membrans doped with heteropolyacides for applicationin direct methanol fuel cellsm" Solid State Ionics, 145 (1-4), pp. 101-107 (2001).*

(Continued)

*Primary Examiner*—Patrick Ryan
*Assistant Examiner*—Monique Wills
(74) *Attorney, Agent, or Firm*—Buchanan Ingersoll & Rooney PC (57) ABSTRACT

A polymer electrolyte and a fuel cell employing the polymer electrolyte are provided. The polymer electrolyte includes: an ionic conductive polymer membrane; a porous support having nano-sized pores; and inorganic conductive nano-particles including an ionic conductive material impregnated into the porous support, wherein the inorganic conductive nano-particles are impregnated into microchannels formed by aggregation of polar portions of the ionic conductive polymer membrane, and/or between polymer backbones of the ionic conductive polymer membrane.

7 Claims, 4 Drawing Sheets

A : FLUORO CARBON BACKBONE
B : BOUNDARY PORTION
C : CLUSTER PORTION

● : INORGANIC CONDUCTIVE NANO-PARTICLE

OTHER PUBLICATIONS

Partial European Search Report issued by the European Patent Office on Oct. 4, 2004 in corresponding application 02018537.

P. Staiti et al., "Membranes based on phosphotungstic acid and polybenzimidazole for fuel cell application," Journal of Power Sources, 90 (2000), pp. 231-235.

B. Tazi et al., Effect of Various Heteropolyacids (HPAs) on the Characteristics of Nafion®—HPAS Membranes and their $H_2/O_2$ Polymer Electrolyte Fuel Cell Parameters, Journal of New Materials for Materials for Electrochemical Systems, vol. 4, 2001, pp. 187-196.

P. Staiti et al., "Hybrid Nafion—silica membranes doped with heteropolyacids for application in direct methanol fuel cells," Solid State Ionics, 145 (1-4), pp. 101-107 (2001).

U. LavrenčičStangar et al., "Proton-conducting sol-gel hybrids containing heteropoly acids," Solid State Ionics, 145 (1-4), pp. 109-118 (2001).

Japanese Office Action dated Sep. 5, 2006.

* cited by examiner

FIG. 1

A : FLUORO CARBON BACKBONE
B : BOUNDARY PORTION
C : CLUSTER PORTION

● : INORGANIC CONDUCTIVE NANO-PARTICLE

POLYMER ELECTROLYTE COMPRISING INORGANIC CONDUCTIVE NANO-PARTICLES AND FUEL CELL EMPLOYING THE POLYMER ELECTROLYTE

Priority is claimed to Patent Application Number 2001-67148 filed in Republic of Korea on Oct. 30, 2001, herein incorporated by reference.

BACKGROUND OF THE INVENTION

1. Field of the Invention

The present invention relates to a polymer electrolyte containing inorganic conductive nano-particles and a fuel cell employing the polymer electrolyte, and more particularly, to a polymer electrolyte having excellent ionic conductivity and capable of effectively blocking flow of methanol by inorganic conductive nano-particles contained in the polymer electrolyte and a fuel cell employing the polymer electrolyte.

2. Description of the Related Art

Direct methanol fuel cells (DMFCs) directly supply a liquid fuel such as methanol to electrodes, so they need no additional equipment such as a fuel reformer or a hydrogen reservoir, which is required in polymer electrolyte fuel cells. DMFCs can be miniaturized to be readily applied under any urgent situation. Furthermore, DMFCs have a high energy density and is easily available as an environment-friendly, clean energy source. One of most important factors which affect the performance and cost of such DMFCs is a polymer electrolyte used therein.

In a fluorinated polymer membrane, which is widely used as a polymer membrane for a DMFC, methanol is liable to migrate while being hydrated, rather than be oxidized, so that cross-over of the methanol through the polymer membrane occurs. Greater cross-over of the methanol further reduces the potential of the fuel cell and hinders the reduction of oxygen and thus is considered to be the main cause of performance degradation of the fuel cell. Therefore, suppressing the cross-over of methanol is the first consideration for practical uses of the DMFC.

The DMFC needs a kind of barrier for blocking direct migration of the methanol between an anode and an cathode while allowing only protons to pass.

Even if a polymer membrane capable of acting as a barrier that passes only protons while suppressing the cross-over of the methanol is available, performance of the DMFC may degrade due to generation of over-voltage if proton conductivity of the polymer membrane is low.

U.S. Pat. No. 5,874,182 discloses a method of minimizing the effect of the cross-over of the methanol by using excess catalyst in the electrode. However, this method was unsatisfactory in suppressing the methanol's cross-over and is not considered to be a fundamental solution of the cross-over. As a result, many attempts have been made to improve the performance of the DMFC by improving the polymer electrolyte membrane itself so as to prevent the cross-over of methanol.

U.S. Pat. No. 5,795,668 discloses a method of reducing cross-over of methanol by supporting solid polymer electrolyte membranes against both sides of a porous support. U.S. Pat. No. 5,958,616 discloses a method of oxidizing methanol, with the addition of a catalyst, to an electrolyte membrane that is formed to incorporate channel or path for methanol therein. However, this method increased the cross-over of methanol through the channel or path of the electrolyte membrane. In addition, the use of the catalyst and the porous support further increases the cost of the solid electrolyte membrane, which is already expensive to produce, and thus the method is impractical.

U.S. Pat. No. 5,919,583 discloses a method of reducing cross-over in a DMFC by dispersing an inorganic material such as zeolite and zirconium in the polymer electrolyte. However, this method has the following problems. To incorporate such inorganic particles into the polymer electrolyte composition, there is a need to change the polymer electrolyte composition into an alkaline state, which is a complicated process. Furthermore, such simple dispersion of the inorganic particles in the polymer electrolyte membrane is effective in preventing the methanol crossover but the proton conductivity is decrease. As described above, although approaches have been made in a variety of aspects to reduce the cross-over of methanol in the DMFC, those suggestions still have considerable technical limitations in the decrease proton conductivity.

SUMMARY OF THE INVENTION

To solve the above-described problems, it is a first object of the present invention to provide a polymer electrolyte having excellent ionic conductivity and capable of effectively reducing cross-over of methanol by inorganic conductive nano-particles dispersed therein and a method for preparing the polymer electrolyte.

It is a second object of the present invention to provide a fuel cell having improved efficiency by employing the polymer electrolyte.

To achieve the first object of the present invention, there is provided a polymer electrolyte comprising: an ionic conductive polymer membrane; a porous support having nano-sized pores; and inorganic conductive nano-particles including an ionic conductive material impregnated into the porous support, wherein the inorganic conductive nano-particles are impregnated into at least one selected from the group consisting of microchannels formed by aggregation of polar portions of the ionic conductive polymer membrane, and between polymer backbones of the ionic conductive polymer membrane.

Preferably, the ionic conductive material is at least one selected from the group consisting of a heteropoly acid of formula (1) below, a phosphoric acid of formula (2) below, a sulfuric acid, and salts of these materials:

where X is one selected from the group consisting of boron (B), aluminum (Al), gallium (Ga), tin (Sn), phosphorous (P), antimony (Sb), tellurium (Te), iodine (I), and transition metals; Y is a transition metal; m1 is an integer from 1 to 10; n1 is an integer from 2 to 100, R is selected from the group consisting of C1-C20 hydroxyalkyl, C1-C20 alkyl, phenyl, phenyl substituted with C1-C20 alkyl group, vinyl, C1-C20 halogenated alkyl, halogenated phenyl, halogenated methylphenyl, and amine groups; m2 is an integer from 1 to 10; and n2 is an integer from 0 to 20.

Preferably, each of the transition metals X and Y is one selected from the group consisting of tungsten (W), molybdenum (Mo), phosphorous (P), silicon (Si), cobalt (Co), cesium (Cs), vanadium (V), and nickel (Ni).

Preferably, the inorganic conductive nano-particles have a size of from about 3 to about 50 nm. Preferably, the ionic conductive polymer membrane comprises at least one ionic conductive polymer selected from the group consisting of a 4-fluorinated sulfonated polymer and a benzene sulfonated polymer membrane having a benzene ring, and the ionic conductive polymer membrane has a thickness of from 30 to 200 μm.

Preferably, the porous support is at least one selected from the group consisting of silica, alumina, zirconia, zeolite, and titania, and the porous support has a pore size of from 0.1 to 50 nm.

In the polymer electrolyte according to the present invention, preferably, an amount of the porous support is in the range of 10-90 parts by weight based on 100 parts by weight the inorganic conductive nano-particles, an amount of the ionic conductive material is in the range of 10-90 parts by weight based on the inorganic conductive nano-particles, and an amount of the ionic conductive nano-particles is in the range of 3-90 parts by weight based on 100 parts by weight the polymer electrolyte.

To achieve the first object of the present invention, there is also provided a method for preparing a polymer electrolyte, the method comprising: (a) obtaining a mixture in an oily phase by adding a solvent to a surfactant; (b) soaking an ionic conductive polymer membrane in the mixture, stirring and adding an ionic conductive material and pure water to the mixture, and neutralizing the mixture with a base; (c) adding a precursor of a porous support to the mixture and mixing the mixture; (d) drawing the ionic conductive polymer membrane out of the mixture and washing and drying the ionic conductive polymer membrane, wherein inorganic conductive nano-particles are impregnated into at least one selected from the group consisting of micro-channels, and polymer backbone of the ionic conductive polymer membrane, the micro-channels being formed by agglomeration of polar portions of an ionic conductive polymer constituting the ionic conductive polymer membrane.

Preferably, the solvent in step (a) is at least one selected from the group consisting of isooctane, n-hexane, cyclohexane, dodecane, toluene, decane, heptane, hexadecane, and 1-hexanol, and an amount of the solvent is in the range of 8000 to 12000 parts by weight based on 100 parts by weight the ionic conductive material.

Preferably, the surfactant in step (a) comprises a non-ionic surfactant selected from the group consisting of Triton (benzyltrimethylammonium hydroxide), Berol 26 (polyoxyethylene nonylphenylether), and Berol 160 (polyoxyethylene dodecylether), and an ionic surfactant selected from the group consisting of SPAN (sorbitan monoleate, sorbitan monopalmitate), Arlacel (sorbitan sesquioleate), and AOT (sodium bis(2-ethylhexyl)sulfoxylmate). Preferably, an amount of the surfactant is in the range of 50-150 parts by weight based on 100 parts by weight the ionic conductive material. Preferably, an amount of the pure water in step (b) is in the range of 3-10 parts by weight based on 100 parts by weight the ionic conductive polymer constituting the ionic conductive polymer membrane, and the base in step (b) is one selected from the group consisting of ammonia water and sodium hydroxide.

Preferably, the precursor of the porous support in step (c) is at least one selected from the group consisting of zirconium alkoxide, titanium alkoxide, silicon alkoxide, and aluminum alkoxide, and an amount of the precursor is in the range of 5-90 parts by weight based on 100 parts by weight the ionic conductive material.

Preferably, an alcoholic solvent is used as a washing solvent in step (d), and the drying is performed at a temperature of 80-120° C.

The second object of the present invention is achieved by a fuel cell adopting the polymer electrolyte described above. Preferably, the fuel cell according to the present invention is a direct methanol fuel cell.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Prior to description of the principle of the present invention, the term of "micro-channel" used throughout this specification will be defined. A "micro-channel" refers to a kind of path formed by aggregation of polar portions of a conductive polymer membrane, which consists of the polar portions and non-polar portions.

A polymer electrolyte according to the present invention has a structure where inorganic conductive nano-particles are impregnated into micro-channels and/or between polymer backbones of a conductive polymer membrane constituting the electrolyte. An embodiment of the structure of the polymer electrolyte according to the present invention will be described in greater detail with reference to FIG. 1.

Figure 1:
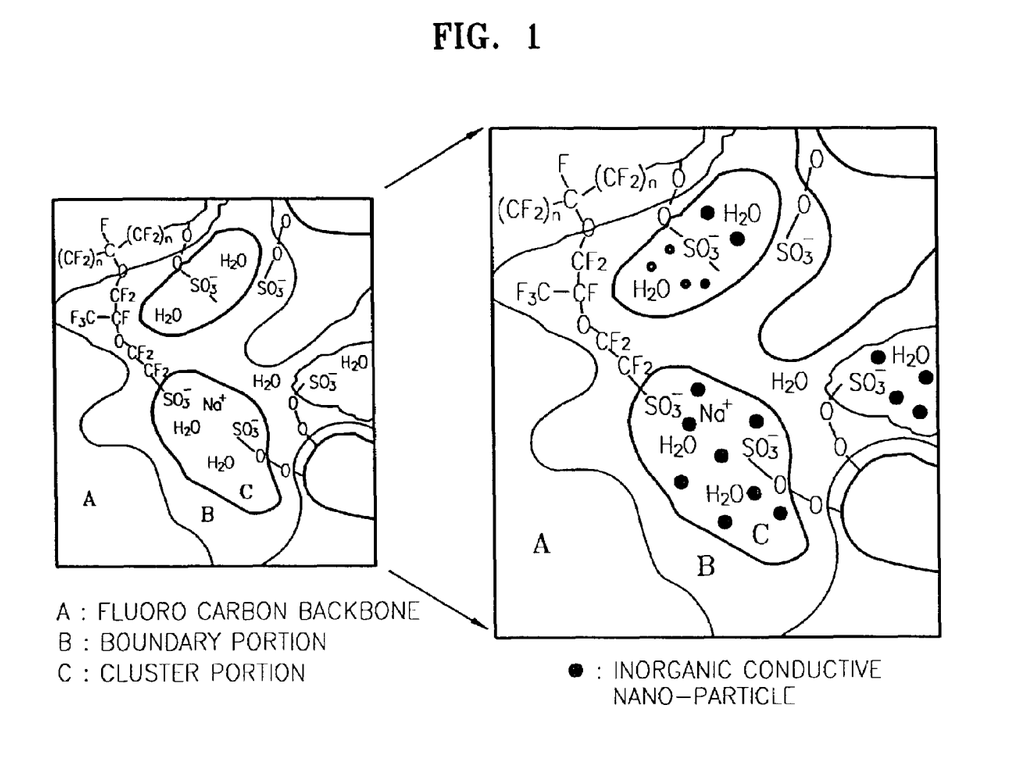
FIG. 1 illustrates the impregnation of inorganic conductive nano-particles into a micro-channel and between polymer backbones of an ionic conductive polymer according to the present invention.

FIG. 1 shows a fluorocarbon ionomer as an ionic conductive polymer. Referring to FIG. 1, the ionomer roughly divided into a non-polar portion and a polar portion. Fluorocarbon backbone A is considered to be the non-polar region. Free volume inside fluorocarbon backbone A is expanded when the polymer electrolyte is hydrated in water or alcoholic solution. In the polar portion where negative and positive ions of the terminal of the backbone are also expanded, if the polymer electrolyte is hydrated in water or alcoholic solution. As shown in FIG. 1, polar portions (cluster portion C) are connected to form a micro-channel, and inorganic conductive nano-particles are impregnated into the micro-channel and between polymer backbones. In FIG. 1, reference character B denotes a boundary portion.

A method for preparing the polymer electrolyte according to the present invention will be described. Initially, a surfactant is dispersed into a solvent to obtain a mixture in an oily phase. The surfactant may be a non-ionic surfactant selected from the group consisting of Triton (benzyltrimethylammonium hydroxide), Berol 26 (polyoxyethylene nonylphenylether), Berol 160 (polyoxyethylene dodecylether), and Bero 267 (polyoxyethylene nonylphenyl ether), or an ionic surfactant selected from the group consisting of SPAN (sorbitan monoleate, sorbitan monopalmitate), Arlacel (sorbitan sesquioleate), and AOT (sodium bis(2-ethylhexyl)sulfoxylmate). The surfactant enables emulsion formation. An amount of the surfactant is in the range of 100-200 parts by weight based on 100 parts by weight an ionic conductive material. A solvent as a dispersion medium of the surfactant is at least one selected from the group consisting of isooctane, n-hexane, cyclohexane, dodecane, toluene, decane, heptane, hexadecane, and 1-hexanol. The solvent enables oily phase formation. An amount of the solvent is in the range of 8000-12000 parts by weight based on 100 parts by weight the ionic conductive material. If an amount of the solvent exceeds this range, it may be difficult to obtain particles of a desired size. Also, due to agglomeration of the particles, the particles are enlarged to on the order of several microns and become non-uniform in size.

Next, an ionic conductive polymer membrane is soaked in the oily phase mixture and thoroughly mixed. Here, as the ionic conductive polymer membrane, a 4-fluorinated sulfonated polymer membrane or a benzene ring-attached sulfonated polymer membrane is used. Suitable 4-fluorinated sulfonated polymer membranes include a Nafion 112 membrane (DuPont), a Nafion 115 membrane (DuPont), Aciplex membrane (Ashai Glass Co.), a Gore membrane, a perfluorinated sulfonic acid membrane, a sulfonated polystyrene membrane, a sulfonated polyimide membrane, a polybenzimidazole membrane, and a sulfonated polyethersulfone membrane. Suitable benzene ring-attached sulfonated polymer membranes include a benzene ring-attached polyether sulfone membrane, a benzene ring-attached polysulfone membrane, and a benzene ring-attached polystyrene membrane. Here, it is preferable that the ionic conductive polymer membrane has a thickness of 30-200 µm. If a thickness of the ionic conductive polymer membrane is less than 30 µm, the ionic conductive polymer membrane may be easily broken when inorganic particles are impregnated thereinto. If a thickness of the ionic conductive polymer membrane is greater than 200 µm, resistance may increase to reduce ionic conductivity.

Next, after addition of an ionic conductive material and pure water, the mixture is neutralized with alkali. Here, as the ionic conductive material, at least one selected from the group consisting of a heteropoly acid of formula (1) below, a phosphoric acid of formula (2) below, sulfuric acid and salts of these materials are used. It is preferable that an amount of the ionic conductive material is in the range of 10-90 parts by weight based on 100 parts by weight inorganic conductive nano-particles. If an amount of the ionic conductive material exceeds this range, it is undesirable in terms of conductivity of the inorganic conductive nano-particles.

$$H_{m1}[X_xY_yO_z]\cdot n_1H_2O \qquad (1)$$

$$(2)$$

where X is one selected from the group consisting of boron (B), aluminum (Al), gallium (Ga), tin (Sn), phosphorous (P), antimony (Sb), tellurium (Te), iodine (I), and transition metals; Y is a transition metal; m1 is an integer from 1 to 10; n1 is an integer from 2 to 100, R is selected from the group consisting of C1-C20 hydroxyalkyl, C1-C20 alkyl, phenyl, phenyl substituted with C1-C20 alkyl group, vinyl, C1-C20 halogenated alkyl, halogenated phenyl, halogenated methylphenyl, and amine groups; m2 is an integer from 1 to 10; and n2 is an integer from 0 to 20.

In formula (1) and (2) above, examples of the transition metal include tungsten (W), molybdenum (Mo), phosphorous (P), silicon (Si), cobalt (Co), cesium (Cs), vanadium (V), and nickel (Ni). Examples of the C1-C20 hydroxyalkyl group includes hydroxymethyl and hydroxyethyl groups. Examples of the C1-C20 alkyl group include methyl, ethyl, propyl, butyl, and pentyl groups. Examples of the phenyl group substituted with C1-C20 alkyl group include methylphenyl and ethylphenyl groups. Examples of the C1-C20 halogenated alkyl group include chloromethyl and chloroethyl groups. An example of the halogenated phenyl group includes a chlorophenyl group. An example of the halogenated methylphenyl group includes a chloromethylphenyl group.

Preferably, the heteropoly acid of formula (1) above comprises 12 tungsto (VI) phosphoric acid, silicotungsto (VI) phorphoric acid, tungstosilicic acid, cesium hydrogen tungstosilicate, molybdophosphoric acid, molybdosilicic acid, ammonium molybdodiphosphate, sodium molybdophosphate, potassium tungstophosphate, and potassium molybdodivanado phosphate.

Any base capable of neutralizing the reaction mixture can be used. Examples of the base include ammonia water and sodium hydroxide (NaOH). An amount of the base is adjusted such that the pH of the reaction mixture is maintained at 5-7. An amount of the pure water added is in the range of 60-70 parts by weight based on 100 parts by weight the ionic conductive material. If an amount of the pure water added exceeds this range, agglomeration of the particles occurs.

Next, a precursor of a porous support is added to the neutralized reaction mixture prepared above and stirred such that inorganic conductive nano-particles are impregnated into microchannels of an ionic conductive polymer membrane, and/or between polymer backbones of the ionic conductive polymer membrane. The precursor of the porous support is selected from the group consisting of zirconium alkoxide, titanium alkoxide, silicon alkoxide, and aluminum alkoxide. An amount of the precursor is in the range of 50-300 parts by weight based on 100 parts by weight the ionic conductive material. If an amount of the porous support precursor exceeds this range, the resulting particles may be greater than a desired particle size.

Next, the resulting ionic conductive polymer membrane is drawn out of the mixture and washed to remove the surfactant. An alcoholic solvent such as ethanol is used as a washing solvent.

Next, the ionic conductive polymer membrane is dried to obtain a polymer electrolyte containing the inorganic conductive nano-particles impregnated into the microchannels of the ionic conductive polymer, and/or between polymer backbones of the ionic conductive polymer membrane. The drying process is performed at a temperature of 80-120° C., but may be varied depending on the type of the ionic conductive polymer used.

The polymer electrolyte according to the present invention prepared through the processes described above includes the ionic conductive polymer membrane and the inorganic conductive nano-particles containing the porous support having nano-sized pores and the ionic conductive materials impregnated into the porous support. The porous support may have a pore size of 0.1-300 nm and may be formed of at least one selected from the group consisting of silica, alumina, zirconia, zeolite, and titania. Preferably, an amount of the porous support may be in the range of 50-300 parts by weight based on 100 parts by weight the inorganic conductive nano-particles. If a pore size and amount of the porous support exceed those ranges, it may be difficult to stably support the ionic conductive materials with the porous support.

In the present invention, it is preferably that the inorganic conductive nano-particles have a size of 0.1-50 nm. If a size of the inorganic conductive nano-particles is greater than 50 nm, it is impossible to impregnate the inorganic conductive nano-particles into the microchannels of the polymer membrane. If a size of the inorganic conductive nano-particles is smaller than 0.1 nm, the inorganic conductive nano-particles are undesirably separated from the polymer membrane over time. Preferably, an amount of the inorganic conductive nano-particles impregnated into the polymer membrane is in the range of 3-90 parts by weight based on 100 parts by weight the polymer electrolyte. If an amount of the inorganic conductive nano-particles is greater than 90 parts by weight, formation of the polymer membrane may be difficult. If an amount of the inorganic conductive nano-particles is less than 3 parts by weight, the addition of the inorganic conductive nano-particles is not effective.

A fuel cell according to the present invention is manufactured by forming a single cell by placing between the anode and cathode the polymer electrolyte prepared through the processes above. The fuel cell includes proton exchange membrane fuel cells (PEMFCs) and direct methanol fuel cells (DMFCs). When a DMFC adopts the polymer electrolyte according to the present invention, a higher inorganic conductive nano-particle content in the polymer membrane more effectively reduces the cross-over of methanol, thereby improving cell efficiency.

The polymer electrolyte according to the present invention is applicable to fuel cells, sensors, electrochemical displays, etc. When used as an electrolyte membrane of a fuel cell, it provides good ionic conductivity and effectively reduces the cross-over of methanol so that cell efficiency is improved.

The present invention will be described in greater detail with reference to the following examples. The following examples are for illustrative purposes and are not intended to limit the scope of the invention.

Example 1

Preparation of Polymer Electrolyte 7.12 g dioctyl sulfosuccinate was completely dissolved in 300 g cyclohexane and 60 g 1-hexanol to form an oily phase. A Nafion 115 polymer membrane (Aldrich Chemical Co.) was put into the solution and stirred. After additions of 3 g 12 tungsto (VI) phosphoric acid ($H_3PW_{12}O_{40} \cdot nH_2O$, where n=6-8) and 2 g pure water and mixing, the mixture was pH-adjusted to be 5-7 with 1 g of ammonia water and stirred for 30 minutes.

Subsequently, 10 g tetraethyl orthosilicate was added to the mixture and stirred for 36-49 hours. The membrane was drawn out of the mixture, washed with ethanol to remove the surfactant, and dried at 90° C. to obtain a polymer electrolyte containing 12 tungsto (VI) phosphoric acid-impregnated silica nano-particles impregnated into microchannels of the Nafion 115 membrane, and between polymer backbones of the Nafion 115 membrane.

Example 2

A polymer electrolyte was prepared in the same manner as in Example 1 except that 1 g dioctyl sulfosuccinate, 28.55 g 12 tungsto (VI) phosphoric acid ($H_3PW_{12}O_{40} \cdot nH_2O$, where n=6-8), and 41.60 g tetraethyl orthosilicate were used.

Example 3

A polymer electrolyte was prepared in the same manner as in Example 2 except that 3 g 12 tungsto (VI) phosphoric acid ($H_3PW_{12}O_{40} \cdot nH_2O$, where n=6-8) and 0.14 g ammonia water were used.

Example 4

A polymer electrolyte was prepared in the same manner as in Example 3 except that 36 g pure water and 10 g tetraethyl orthosilicate were used.

Example 5

A polymer electrolyte was prepared in the same manner as in Example 4 except that 28.55 g 12 tungsto (VI) phosphoric acid ($H_3PW_{12}O_{40} \cdot nH_2O$, where n=6-8) and 1 g ammonia water were used.

Example 6

A polymer electrolyte was prepared in the same manner as in Example 5 except that 3 g 12 tungsto (VI) phosphoric acid ($H_3PW_{12}O_{40} \cdot nH_2O$, where n=6-8) and 41.60 g tetraethyl orthosilicate were used.

Example 7

A polymer electrolyte was prepared in the same manner as in Example 6 except that 28.55 g 12 tungsto (VI) phosphoric acid ($H_3PW_{12}O_{40} \cdot nH_2O$, where n=6-8) and 0.14 g ammonia water were used.

Example 8

A polymer electrolyte was prepared in the same manner as in Example 7 except that 2 g pure water and 10 g tetraethyl orthosilicate were used.

For the polymer electrolytes prepared in Examples 1 through 8, the size distribution of the silica nano-particles was measured. Here, the size of silica nano-particles were measured using a MICROTRAC-UPA150 (Honeywell Co) and from the degree of scattering of laser light in a dispersion of the inorganic particles.

Figure 5:
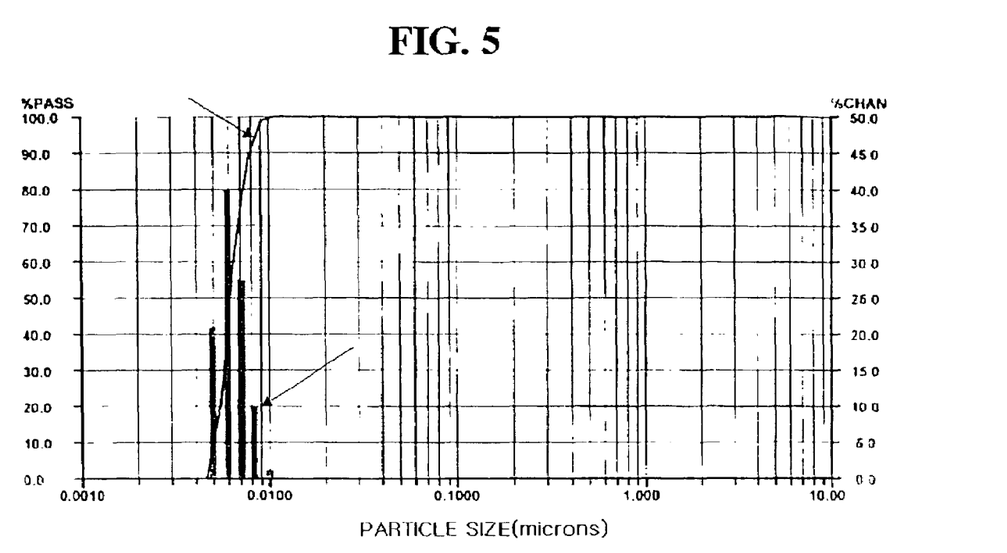
FIG. 5 is a graph of distribution of silica nano-particle sizes prepared in Example 3 according to the present invention.

As a result, the inorganic conductive nano-particles of Examples 1 through 8 were observed to have a particle size ranging from 5 to 200 nm on average. FIG. 5 shows the size distribution of the silica nano-particles prepared in Example 3. Referring to FIG. 5, the average particle size is about 5 nm. In FIG. 5, "% PASS" on the left Y-axis denotes the percentage of particles smaller than a given size, and "% CHAN" on the right Y-axis denotes the percentage with a given size.

The amount of tungsten (W) in each of the polymer electrolytes of Examples 1 through 8 and the Nafion 115 membrane was analyzed using inductively coupled plasma (ICP). The results are shown in Table 1.

TABLE 1

| Example | W content (wt %) |
|---|---|
| Example 1 | 0.085 |
| Example 2 | 0.444 |
| Example 3 | 0.796 |
| Example 4 | 0.078 |
| Example 5 | 0.084 |
| Example 6 | 0.025 |
| Example 7 | 0.431 |
| Example 8 | 0.082 |
| Nation 115 membrane | 0.0080 |

As shown in Table 1, considerable increases in the amounts of W are observed in the polymer electrolytes of Examples 1 through 8, compared to the Nafion 115 membrane. This result supports the fact that silica nano-particles are impregnated into the Nafion 115 membrane of the polymer electrolytes.

Figure 2:
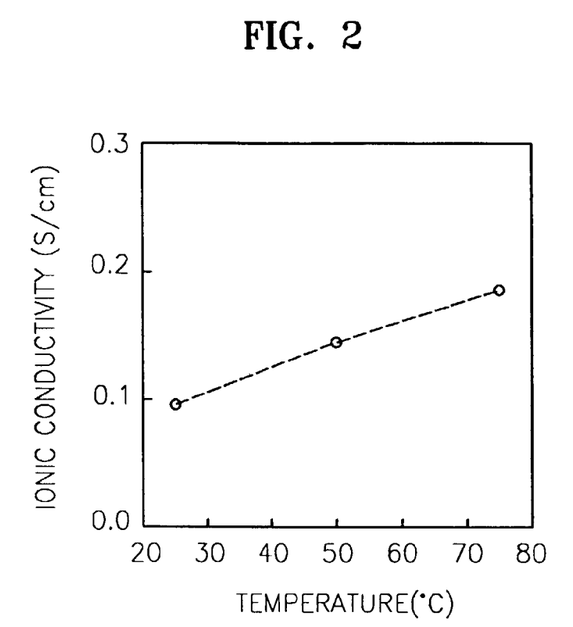
FIG. 2 is a graph of ionic conductivity of a polymer electrolyte manufactured in Example 3 according to the present invention.

The ionic conductivity of the polymer electrolyte prepared in Example 3 was measured. The result is shown in FIG. 2. As shown in FIG. 2, the electrolyte polymer of Example 3 has excellent ionic conductivity.

Likewise, the ionic conductivity of the polymer electrolytes of Examples 1 and 2, and 4 through 8 was measured. Those polymer electrolytes have a similar ionic conductivity to the electrolyte polymer of Example 3.

Example 4

Manufacture of Direct Methanol Fuel Cell

A polymer electrolyte prepared according to Example 1 was washed with distilled water and dried at 95° C. On both sides of the dried polymer electrolyte, a PtRu anode and a Pt cathode were arranged to form a unit cell so that a DMFC was manufactured using the unit cell.

Example 4 Through 19

DMFCs were manufactured in the same manner as in Example 9 except that the polymer electrolytes of Examples 2 through 8 were used, respectively, instead of the polymer electrolyte of Example 1.

Comparative Example 1

A DMFC was manufactured in the same manner as in Example 9 except that a Nafion 112 membrane was used instead of the polymer electrolyte of Example 1.

Comparative Example 2

A DMFC was manufactured in the same manner as in Example 9 except that a Nafion 115 membrane was used instead of the polymer electrolyte of Example 1.

Figure 3:
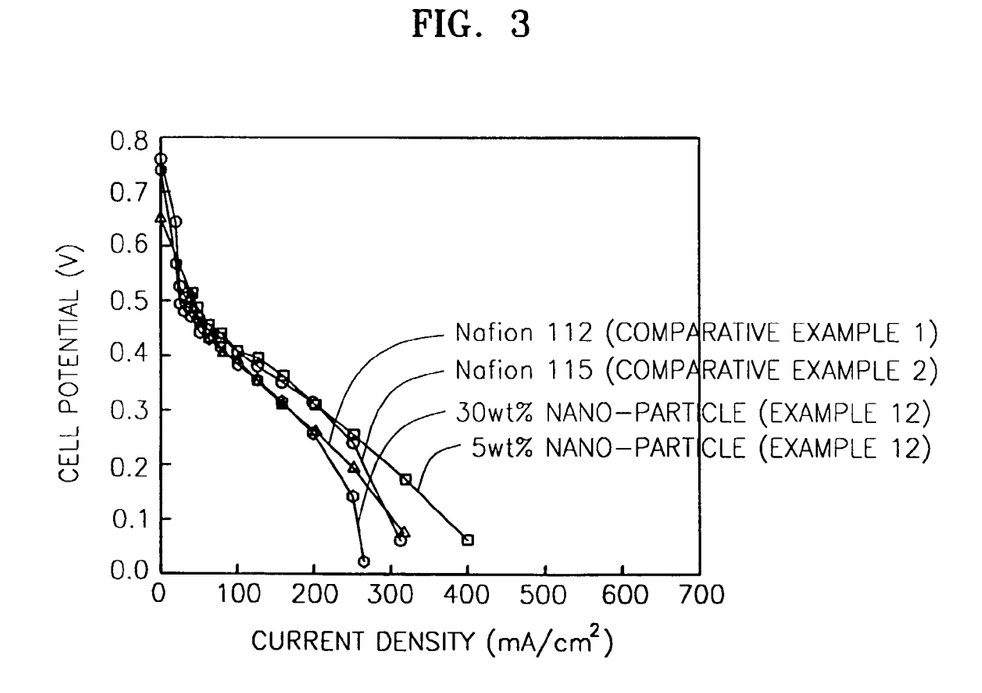
FIG. 3 is a graph of a change in cell potential with respect to current density in direct methanol fuel cells (DMFCs) manufactured in Example 12 and Comparative Examples 1 and 2 according to the present invention.

Cell efficiency was measured for the DMFCs manufactured in Example 12 and Comparative Examples 1 and 2. The results are shown in FIG. 3. Here, cell efficiency was measured as a current density with respect to potential and a ratio of current density reduction due to the cross-over of methanol. The greater the current density with respect to potential and the smaller the current density reduction due to the methanol's cross-over, the better the cell efficiency. The results are shown in FIGS. 3 and 4.

Referring to FIG. 3, the DMFC of Example 12 has better or similar cell performance than Comparative Examples 1 and 2. The current density with respect to cell potential is higher for the DMFC of Example 12 than for the DMFCs of Comparative Examples 1 and 2. The current density of the DMFC of Example 12 was measured with different amounts of nano-particles at 5 wt % by weight and 30 wt % by weight. The amount of the nano-particles was calculated by measuring the weight of the Nafion 115 membrane before and after soaking.

Figure 4:
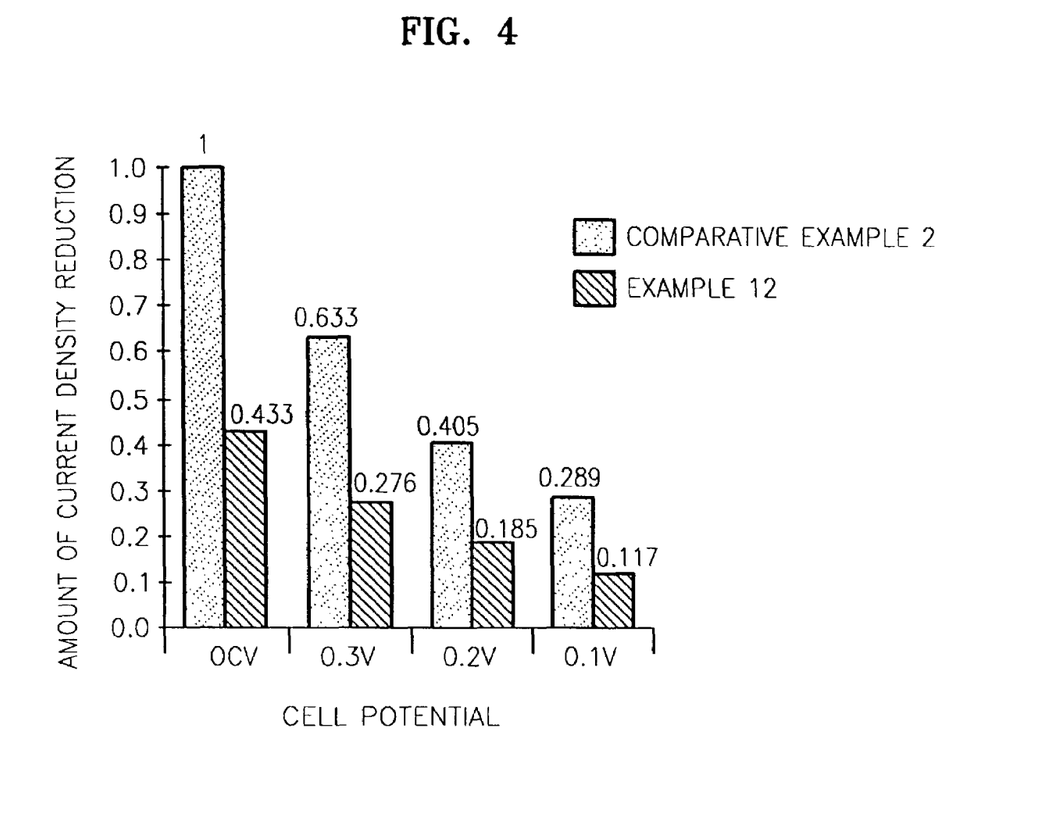
FIG. 4 is a graph of the cross-over of methanol in DMFCs manufactured in Example 12 according to the present invention and Comparative Example 2.

In FIG. 4, the Y-axis denotes the amount of reduction in the current density due to cross-over of methanol. The current density loss in the DMFC using the Nafion 115 membrane (Comparative Example 2) was set to 1, and the amount of reduction in the current density of the DMFC of Example 12 was measured relatively with respect to Comparative Example 2. As is apparent from FIG. 4, the current density of the DMFC of Example 12 is less reduced than that of the DMFC of Comparative Example 2 using the Nafion 115 membrane. It is evident from this result that an amount of the methanol's cross-over is reduced in the DMFC of Example 12 than in the DMFC using the Nafion 115 membrane.

In the polymer electrolyte according to the present invention, since the inorganic conductive nano-particles are impregnated into the microchannels of the ionic conductive polymer membrane and/or between polymer backbones, a flow path of methanol become small and thus the cross-over of the methanol is reduced. The polymer electrolyte according to the present invention has good ionic conductivity. A fuel cell adopting the polymer electrolyte according to the present invention also can effectively reduce the cross-over of methanol and has high proton conductivity to increase the proton transmission rate. Accordingly, the fuel cell using the polymer electrolyte is remarkably improved in cell efficiency.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A polymer electrolyte comprising:
   an ionic conductive polymer membrane; and
   inorganic conductive nano-particles including an ionic conductive material impregnated into a porous support,
   wherein the inorganic conductive nano-particles are impregnated into at least one selected from the group of microchannels formed by aggregation of polar portions of the ionic conductive polymer membrane, and between polymer backbones of the ionic conductive polymer membrane,
   wherein the ionic conductive material is a heteropoly acid of formula (1) below:

where X is one selected from the group consisting of boron (B), aluminum (Al), gallium (Ga), tin (Sn), phosphorous (P), antimony (Sb), tellurium (Te), iodine (I), and transition metals; Y is a transition metal; m1 is an integer from 1 to 10; n1 is an integer from 2 to 100, wherein the porous support is at least one selected from the group consisting of silica, alumina, zirconia, zeolite, and titania, and the porous support has a pore size of from 0.1 to 50 nm, and an amount of the porous support is in the range of 10-90 parts by weight based on 100 parts by weight the inorganic conductive nano-particles, an amount of the ionic conductive material is in the range of 10-90 parts by weight based on the inorganic conductive nano-particles, and an amount of the ionic conductive nano-particles is in the range of 3-90 parts by weight based on 100 parts by weight the polymer electrolyte, and a mixed weight ratio of the porous support and the ionic conductive material is 1:9 to 9:1, and the ionic conductive polymer membrane comprises at least one ionic conductive polymer selected from the group consisting of a 4-fluorinated sulfonated polymer and a benzene sulfonated polymer membrane having a benzene ring;

wherein the inorganic conductive nano-particles have a size of from about 0.1 to about 50 nm; and wherein the ionic conductive polymer membrane has a thickness of from 30 to 200 μm.

2. The polymer electrolyte of claim 1, wherein X is a transition metal, and wherein each of the transition metals X and Y is one selected from the group consisting of tungsten (W), molybdenum (Mo), silicon (Si), cobalt (Co), vanadium (V), and nickel (Ni).

3. The polymer electrolyte of claim 1, wherein the porous support has a pore size that is about the same as the size of the inorganic conductive nano-particles.

4. The polymer electrolyte of claim 1, wherein the amount of porous support comprises 50-300 parts by weight based on 100 parts by weight of the inorganic conductive nano-particles.

5. The polymer electrolyte of claim 1, wherein the heteropoly acid of formula (1) comprises:

12 tungsto (VI) phosphoric acid, silicotungsto (VI) phosphoric acid, tungstosilicic acid, cesium hydrogen tungstosilicate, molybdophosphoric acid, molybdosilicic acid, ammonium molybdodiphosphate, sodium molybdophosphate, potassium tungstophosphate, or potassium molybdodivanado phosphate.

6. The polymer electrolyte of claim 1, wherein the inorganic conductive nano-particles are impregnated into an ionic conductive polymer membrane by:

soaking an ionic conductive polymer membrane in a solvent;

adding a heteropoly acid to the ionic conductive polymer membrane in the solvent to form a mixture; and mixing a precursor of a porous support with the mixture, wherein by mixing the heteropoly acid and the precursor, the heteropoly acid and the precursor react to form inorganic conductive nano-particles within at least one selected from the group of microchannels formed by aggregation of polar portions of the ionic conductive polymer membrane, and between polymer backbones of the ionic conductive polymer membrane, thus impregnating the ionic conductive polymer membrane with inorganic conductive nano-particles.

7. The polymer electrolyte of claim 6, wherein the inorganic conductive nano-particles are further formed by:

dispersing a surfactant into the solvent prior to soaking the ionic conductive polymer membrane in the solvent to form the first solution; and neutralizing the mixture with alkali prior to mixing the precursor of the porous support with the mixture.

* * * * *